UNITED STATES PATENT OFFICE.

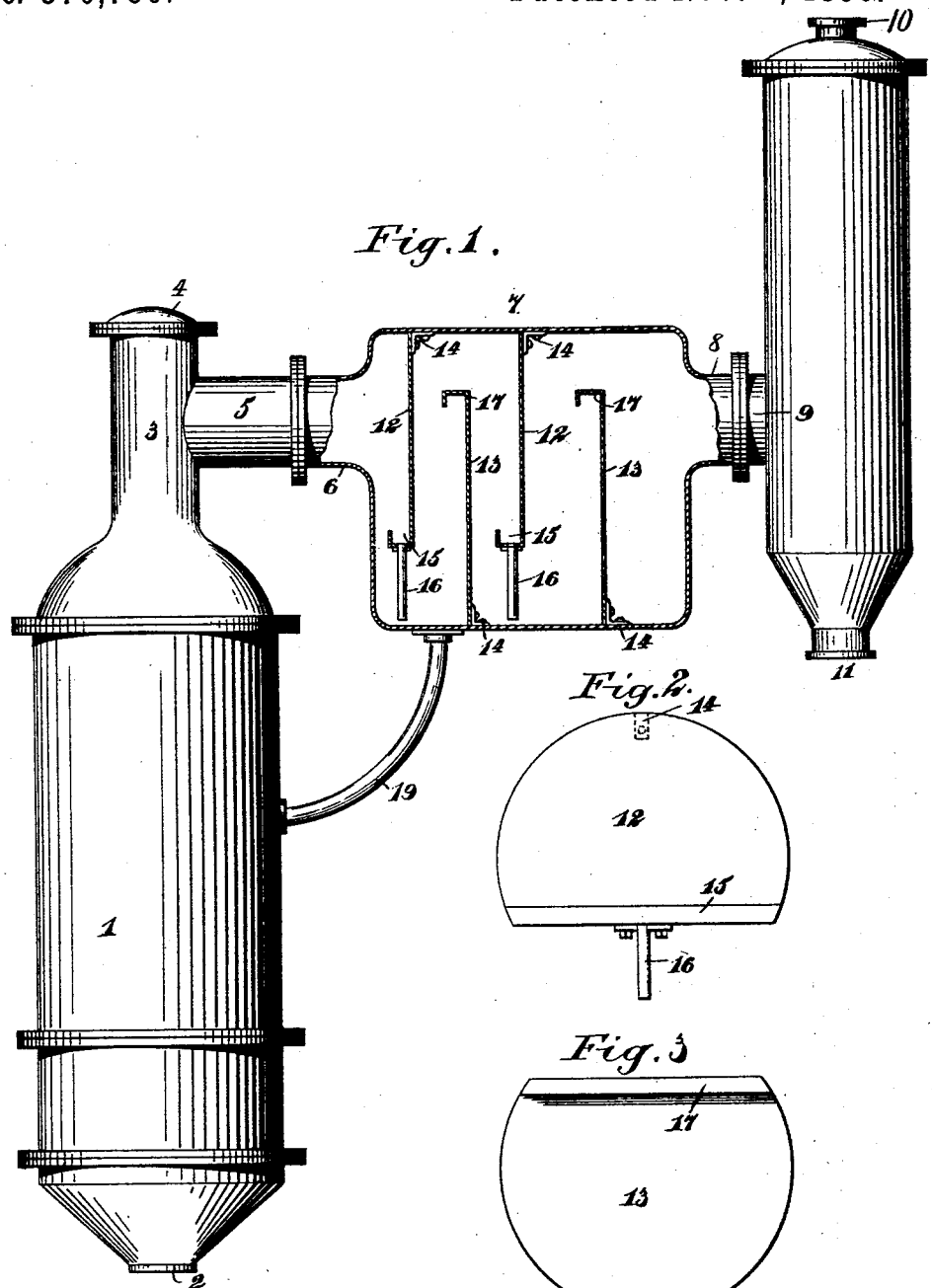

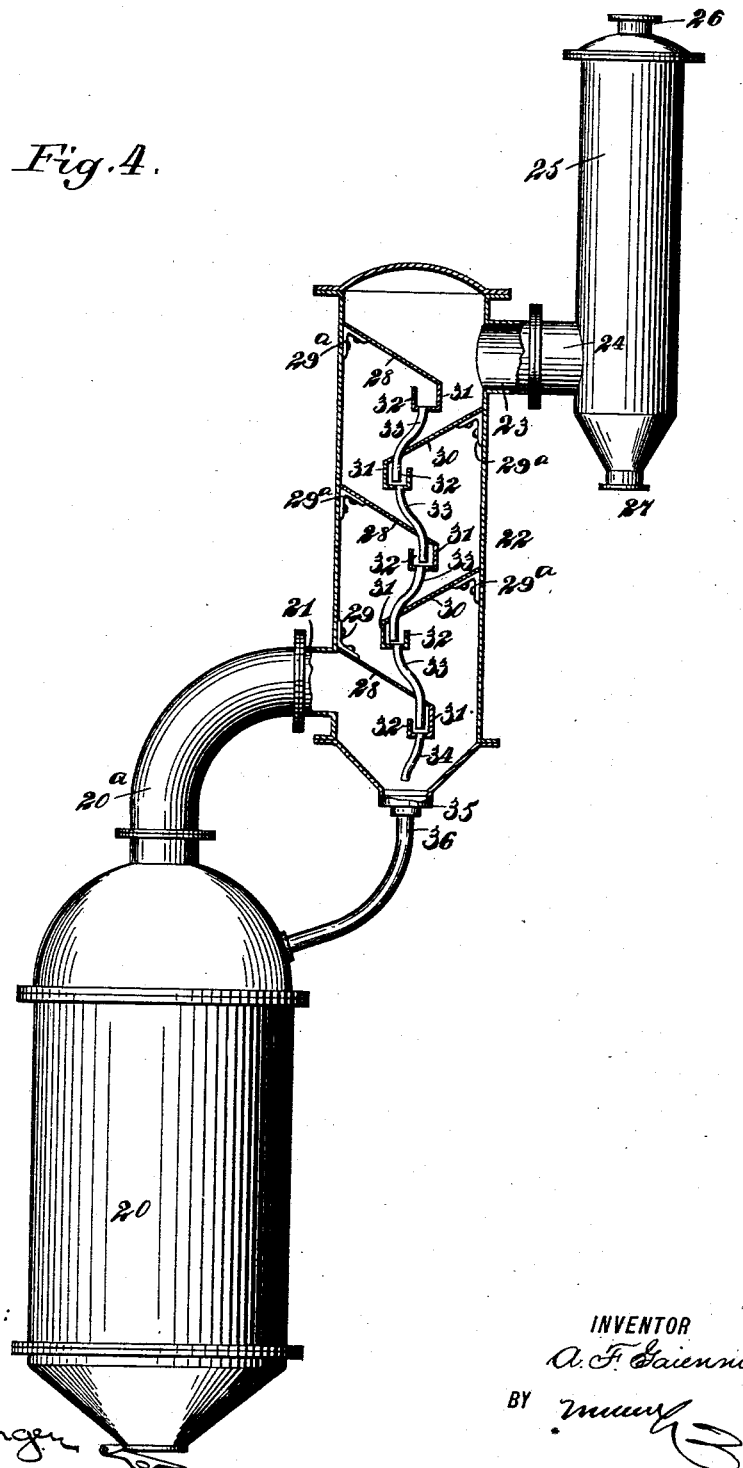

ALPHONSE F. GAIENNIE, OF LAFOURCHE, LOUISIANA, ASSIGNOR OF ONE-THIRD TO JOHN V. LECHE, OF THIBODEAUX, LOUISIANA.

SEPARATOR.

SPECIFICATION forming part of Letters Patent No. 570,790, dated November 3, 1896.

Application filed April 3, 1896. Serial No. 586,060. (No model.)

*To all whom it may concern:*

Be it known that I, ALPHONSE F. GAIENNIE, of Lafourche, in the parish of Lafourche and State of Louisiana, have invented a new and Improved Separator, of which the following is a full, clear, and exact description.

This invention relates to certain improvements in separators, and particularly to that class of separators employed in connection with vacuum-pans and similar evaporating devices for separating and collecting the vapors and minute particles of liquid carried thereby; and the object of the invention is to provide a device of this character of a simple and inexpensive construction which shall be adapted to effect a substantially perfect separation of the liquid from the vapors, the device being also adapted for separating oil and grease from exhaust-steam.

The invention will be fully described hereinafter, and defined in the claims.

Reference is to be had to the accompanying drawings, forming a part of this specification, in which similar characters of reference indicate corresponding parts in all the views.

Figure 1 is a sectional view taken through a horizontally-arranged separator embodying my improvements, said separator being shown as extending between an evaporating device and a water-condenser, which parts are shown in elevation. Fig. 2 is a detached detail view showing the form of the plates of one of the two sets arranged in the separator. Fig. 3 is a similar view showing one of the plates of the other set; and Fig. 4 is a view somewhat similar to Fig. 1, but showing a vertically-arranged separator having inclined plates.

Referring, first, to Figs. 1, 2, and 3, 1 indicates an evaporating device of any preferred kind, having an inlet 2 at its lower end and provided with a reduced neck 3, having a cap or closure 4, and provided with an outlet 5 extending from one of its sides, which outlet is coupled to an inlet-neck 6 on one end of the separator 7, said separator as herein shown being preferably of cylindrical or drum-like form and provided at its opposite end with an outlet-neck 8, which is connected to the inlet 9 of a water-condenser, having its upper end provided with an outlet 10 for the steam or vapor and its lower end with an outlet 11 for the liquid.

Within the drum-like separator 7 are arranged two series of plates 12 and 13, said plates being formed similarly to each other and being adapted to be arranged in opposite positions at the upper and lower parts of the separator. The plates 12 and 13 are, as seen in Figs. 2 and 3, of semicircular form, being cut away at their lower and upper edges, respectively, so as to permit of the passage of the vapors or gases above them when they are in place in the separator.

The plates 12 are held in place at their upper portions in the drum-like separator by means of brackets 14, riveted to the plates and to the wall of the separator, and said plates 12 extend down parallel to the ends of the drum and are provided along their lower edges with transversely-extending channels 15, formed by right-angled bends in the metal of which the plates are composed, the ends of the channel being closed by the side walls of the drum, and in order to lead the water and oil collecting in these channels down to the lower portion of the drum, to prevent it from overflowing from the channels, I provide each channel with an outlet-pipe 16, secured at its central portion and extending downward, as clearly shown in Figs. 1 and 2.

The plates 13 are secured at their lower portions by means of brackets 14 to the lower portions of the wall of the separator-drum, and said plates 13 are provided at their upper edges with transversely-extending flanges 17, bent rearwardly with respect to the path of the vapors through the separator and having their forward edges bent downward so that said flanges serve to impede the passage of the vapors through the separator. At the lower portion of the plate 13 is formed a central opening 18, (clearly shown in Fig. 3,) and serving to permit the passage of the liquid collecting in the bottom of the drum from one end thereof to the other. A discharge-pipe 19 serves to convey the liquid from the lower portion of the separator back to the evaporator 1.

In operation the vapors passing through the neck 6 of the drum 7 are delivered against the first plate 12 and passed down along the surface of the same, depositing the minute particles of liquid carried in suspension on the surface of the plate, and at the lower edge of said plate 12 said vapors come in contact with the projecting trough or channel 15, which serves to still further dry the vapors. The vapors then pass beneath the first plate 12 and into contact with the lower portion of the first plate 13, up which they pass into contact with the projecting flange 17, and after passing over the first plate 13 the vapors will strike the second plate 12 and pass down the same. In this way it will be seen that the vapors are caused to pursue a sinuous path through the separator, each plate serving to partly dry the vapors, and, if desired, the passage between the plates 12 and 13, through which the vapors flow, may be made narrower at the inlet end of the separator and gradually widening toward the discharge end thereof.

As shown in Fig. 4, the evaporator 20 is provided with an outlet-pipe $20^a$, which connects with the inlet 21 at the lower end of the separator-drum 22, which is arranged in a vertical position, being provided at its upper end with an outlet 23 for the gases, which outlet connects with the inlet 24 at the lower end of a water-condenser 25, having upper and lower outlets 26 and 27. In the drum 22 of the separator are arranged two series of plates 28 and 30, inclined oppositely to each other and forming between them a sinuous passage for the vapors entering the lower end of the drum through the inlet 21. The lower plate 28 is provided on its upper face with an angular bracket 29, serving to hold it in place to the side of the separator, and the upper plates 28 and 30 are similarly provided on their lower faces with acute-angled brackets $29^a$, serving to hold them in position.

Each plate 28 and 30 is provided with an integral depending flange 31, formed at its free edge and extending transversely across the drum, said flange being bent horizontally and upwardly at its lower portion to form a channel 32 extending transversely across the drum and located under the lower portion of the plate whereon it is formed, so as to receive and collect the liquid condensing on the under surface of said plate. The channels 32 of the upper plates 28 and 30 are provided with outlet-pipes 33, each of which extends down through the next lower plate 28 or 30 and delivers into the next lower channel 32. The lower channel 32 is provided with an outlet-pipe 34, which extends down and communicates with the outlet 35, formed at the lower end of the drum 22 of the separator, and connects with a pipe 36 leading back to the evaporator 20. The operation of the device shown in Fig. 4 is similar to the operation of the device shown in Fig. 1, excepting that the liquid condensing on one plate and collected in the channel at the lower edge of that plate is discharged into the channel of the next lower plate.

The construction of the device as above described is extremely simple and inexpensive, and is especially well adapted for the purposes for which it is intended, and it will be obvious from the above description that the invention is susceptible of considerable modification without material departure from its principles and spirit, and for this reason I do not wish to be understood as limiting myself to the precise form and arrangement of the parts herein set forth.

Having thus described my invention, I claim as new and desire to secure by Letters Patent—

1. A separator, having semicircular baffle-plates provided with brackets for securing them in place in the drum of the separator, and having angular bends at their free edges forming a passage extending transversely across the drum of the separator when the plates are in place therein, said passages having open ends adapted to be closed by the walls of the drum and being provided with discharge-pipes, substantially as set forth.

2. A separator having a drum provided with an orifice in each end and with a liquid-discharge orifice in one side, a series of baffle-plates secured to the inner sides of the drum and extending partly across the same, the baffle-plates being oppositely arranged so as to form a circuitous passage from one end of the drum to the other, the free edge of each baffle-plate being provided with a flange all of which are bent toward the same end of the drum and form channels running parallel with said free edges, a portion of said channels opening upward and a portion opening downward, and a drip-pipe extending downward from each upwardly-opening channel and discharging into the lower portion of the drum, the lower edges of the baffle-plates which are secured to the lower side of the drum, being formed with orifices providing passages through which liquid may pass to the liquid-discharge orifice, substantially as described.

3. A separator having a drum provided with an orifice adjacent to each end and having a liquid-discharge orifice at a lower portion of the drum, two baffle-plates respectively secured to opposite inner sides of the drum and projecting past each other and partly across the interior of the drum, each baffle-plate having at its free edge a flange both of which are bent toward the same end of the drum and both of which form channels running along said free edges, a drip-tube extending from the channel of one baffle-plate, and an opening in the remaining baffle-plate through which the liquid from the channel of the first baffle-plate may pass to the liquid-discharge orifice, substantially as described.

ALPHONSE F. GAIENNIE.

Witnesses:
P. V. MORVANT,
CHAS. J. COULON.